(12) United States Patent
Seets et al.

(10) Patent No.: US 9,196,279 B2
(45) Date of Patent: *Nov. 24, 2015

(54) NEAR FIELD TRANSDUCER WITH ISOLATED PEG

(71) Applicant: Seagate Technology LLC, Cupertino, CA (US)

(72) Inventors: David C. Seets, Excelsior, MN (US); Yongjun Zhao, Eden Prairie, MN (US); Mark Ostrowski, Lakeville, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/313,197

(22) Filed: Jun. 24, 2014

(65) Prior Publication Data

US 2014/0376345 A1 Dec. 25, 2014

Related U.S. Application Data

(60) Provisional application No. 61/838,862, filed on Jun. 24, 2013.

(51) Int. Cl.
*G11B 5/00* (2006.01)
*G11B 5/48* (2006.01)
*G11B 5/31* (2006.01)
*G11B 13/08* (2006.01)
*G11B 5/187* (2006.01)
*G11B 5/127* (2006.01)
*G11B 5/60* (2006.01)

(52) U.S. Cl.
CPC .............. *G11B 5/4866* (2013.01); *G11B 5/127* (2013.01); *G11B 5/1278* (2013.01); *G11B 5/187* (2013.01); *G11B 5/314* (2013.01); *G11B 5/3133* (2013.01); *G11B 5/3163* (2013.01); *G11B 5/6088* (2013.01); *G11B 13/08* (2013.01); *G11B 5/1871* (2013.01); *G11B 2005/0021* (2013.01); *Y10T 29/49025* (2015.01); *Y10T 29/49032* (2015.01)

(58) Field of Classification Search
None
See application file for complete search history.

(56) References Cited

U.S. PATENT DOCUMENTS

| 5,600,619 | A | 2/1997 | Takekoshi et al. |
|---|---|---|---|
| 5,680,385 | A | 10/1997 | Nagano |
| 7,391,590 | B2 | 6/2008 | Matono et al. |
| 7,500,255 | B2 | 3/2009 | Seigler et al. |

(Continued)

FOREIGN PATENT DOCUMENTS

WO WO2013163195 10/2013

OTHER PUBLICATIONS

Jan. 9, 2015, File History for U.S. Appl. No. 14/220,396.

(Continued)

*Primary Examiner* — Wayne Young
*Assistant Examiner* — Brian Butcher
(74) *Attorney, Agent, or Firm* — Hollingsworth Davis, LLC

(57) ABSTRACT

A method fabricating a near field transducer for a heat assisted magnetic recording head including forming a peg region of a near field transducer along a first portion of a substrate of a heat assisted magnetic recording head, removing a first portion of the peg region, fabricating a barrier material along a surface of the peg region created by the removal of the first portion of the peg region; and forming an enlarged region adjacent the surface such that the barrier material is disposed at least between the surface of the peg region and the enlarged region.

20 Claims, 9 Drawing Sheets

(56) References Cited

U.S. PATENT DOCUMENTS

| | | |
|---|---|---|
| 7,609,480 B2 | 10/2009 | Shukh et al. |
| 7,649,713 B2 | 1/2010 | Ota et al. |
| 7,786,086 B2 | 8/2010 | Reches et al. |
| 7,818,760 B2 | 10/2010 | Seigler et al. |
| 7,848,056 B2 | 12/2010 | Sakamoto et al. |
| 7,986,481 B2 | 7/2011 | Yamanaka et al. |
| 8,077,558 B1 | 12/2011 | Tsutsumi et al. |
| 8,077,559 B1 | 12/2011 | Miyauchi et al. |
| 8,194,511 B2 | 6/2012 | Sasaki et al. |
| 8,320,219 B1 | 11/2012 | Wolf et al. |
| 8,320,220 B1 | 11/2012 | Yuan et al. |
| 8,339,740 B2 | 12/2012 | Zou et al. |
| 8,351,307 B1 | 1/2013 | Wolf et al. |
| 8,351,308 B2 | 1/2013 | Chou et al. |
| 8,374,062 B2 | 2/2013 | Tanaka et al. |
| 8,375,565 B2 | 2/2013 | Hu et al. |
| 8,400,902 B2 | 3/2013 | Huang et al. |
| 8,406,094 B2 | 3/2013 | Matsumoto |
| 8,427,925 B2 | 4/2013 | Zhao et al. |
| 8,451,555 B2 | 5/2013 | Seigler et al. |
| 8,451,705 B2 | 5/2013 | Peng et al. |
| 8,477,454 B2 | 7/2013 | Zou et al. |
| 8,514,673 B1 | 8/2013 | Zhao et al. |
| 8,526,275 B1 | 9/2013 | Yuan et al. |
| 8,547,805 B1 | 10/2013 | Komura et al. |
| 8,565,049 B1 | 10/2013 | Tanner et al. |
| 8,605,555 B1 | 12/2013 | Chernyshov et al. |
| 8,634,280 B1 | 1/2014 | Wang et al. |
| 8,670,215 B2 | 3/2014 | Zou et al. |
| 8,681,590 B2 | 3/2014 | Zhou et al. |
| 8,705,327 B2 | 4/2014 | Matsumoto |
| 8,796,023 B2 | 8/2014 | Reches et al. |
| 8,804,468 B2 | 8/2014 | Zhao et al. |
| 8,817,407 B2 | 8/2014 | Wessel et al. |
| 8,824,086 B2 | 9/2014 | Peng et al. |
| 8,842,391 B2 | 9/2014 | Zou et al. |
| 2004/0004792 A1* | 1/2004 | Hasegawa et al. ........ 360/324.12 |
| 2005/0024957 A1 | 2/2005 | Gider et al. |
| 2006/0233061 A1 | 10/2006 | Rausch et al. |
| 2007/0036040 A1 | 2/2007 | Mihalcea et al. |
| 2007/0139818 A1 | 6/2007 | Shimazawa et al. |
| 2011/0294398 A1* | 12/2011 | Hu et al. ........................ 451/5 |
| 2012/0039155 A1 | 2/2012 | Peng et al. |
| 2012/0218871 A1 | 8/2012 | Balamane et al. |
| 2013/0279315 A1* | 10/2013 | Zhao et al. ................. 369/13.33 |
| 2013/0286804 A1 | 10/2013 | Zhao et al. |
| 2014/0004384 A1 | 1/2014 | Zhao et al. |
| 2014/0043948 A1 | 2/2014 | Hirata et al. |
| 2014/0050057 A1 | 2/2014 | Zou et al. |
| 2014/0226450 A1 | 8/2014 | Peng et al. |

OTHER PUBLICATIONS

Jan. 9, 2015, File History for U.S. Appl. No. 14/069,960.
Jan. 9, 2015, File History for U.S. Appl. No. 14/083,845.
Jan. 9, 2015, File History for U.S. Appl. No. 14/286,279.
Feb. 9, 2015, File History for U.S. Appl. No. 14/276,388.

* cited by examiner

NEAR FIELD TRANSDUCER WITH ISOLATED PEG

RELATED PATENT DOCUMENTS

This application claims the benefit of Provisional Patent Application Ser. No. 61/838,862 filed on Jun. 24, 2013, to which priority is claimed pursuant to 35 U.S.C. §119(e), and which is incorporated herein by reference in its entirety.

SUMMARY

Embodiments disclosed include a method fabricating a near field transducer for a heat assisted magnetic recording head including forming a peg region of the near field transducer along a first portion of a substrate of a heat assisted magnetic recording head, removing a first portion of the peg region, fabricating a barrier material along a surface of the peg region created by the removal of the first portion of the peg region; and forming an enlarged region adjacent the surface such that the barrier material is disposed at least between the surface of the peg region and the enlarged region.

Embodiments are directed to an apparatus such as a near field transducer that includes an enlarged region, a peg region, and a barrier material. The enlarged region comprises a first plasmonic metal and the peg region comprises a second plasmonic metal. The peg region has a single surface that interfaces with the enlarged region. The barrier material is disposed between and spaces the enlarged region from the single surface of the peg region.

Further embodiments are directed to a system for a heat assisted magnetic recording head that includes a near field transducer having a peg region, an enlarged region, and a barrier material. The enlarged region comprises a first plasmonic metal and the peg region comprises a second plasmonic metal. The peg region has a single surface that interfaces with the enlarged region. The barrier material is disposed between and spaces the enlarged region from the single surface of the peg region.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings, where like reference numerals designate like elements, and wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
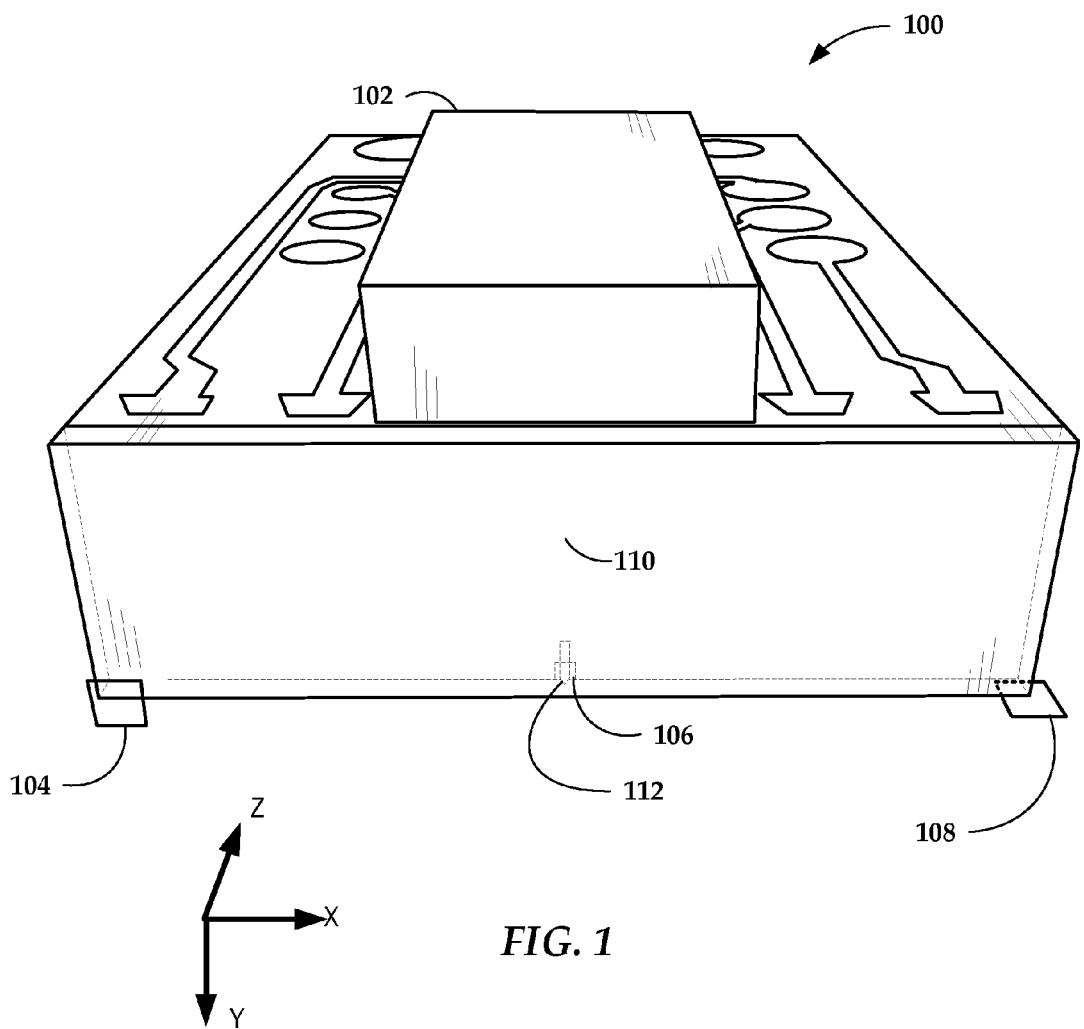
FIG. 1 is a perspective view of a hard drive slider that includes a disclosed near field transducer.

In the following description, reference is made to the accompanying set of drawings that form a part of the description hereof and in which are shown by way of illustration several specific embodiments. It is to be understood that other embodiments are contemplated and may be made without departing from the scope of the present disclosure. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

Various embodiments disclosed herein are generally directed to apparatuses and related methods that facilitate coupling a laser diode to a magnetic writer that includes a magnetic write head. In particular, the apparatuses and methods include a plasmonic near field transducer for heat assisted magnetic recording (HAMR). Plasmonic near field transducers (NFTs) can generate a large amount of heat in their writing tip also called a "peg" or "peg region". This heat can negatively impact the operational life of the near field transducer. Disclosed are apparatuses and methods directed to increasing NFT operational life by reducing likelihood of peg recession of the writing tip. In particular, disclosed herein are apparatuses and related methods that separate the peg region (writing tip) from the remainder of the NFT by a barrier material. This isolation of the peg region from the remainder of the NFT reduces or eliminates interdiffusion of material between the peg region and the remainder of the NFT. The reduction or elimination of interdiffusion of material reduces the likelihood of peg recession. Thus, the near field transducer can better withstand heat buildup in the peg for HAMR.

The present disclosure relates to HAMR, which can be used to increase areal data density of magnetic media. In a HAMR device, information bits are recorded in a storage layer at elevated temperatures in a specially configured magnetic media. The use of heat can overcome superparamagnetic effects that might otherwise limit the areal data density of the media. As such, HAMR devices may include magnetic write heads for delivering electromagnetic energy to heat a small confined media area (spot size) at the same time the magnetic write head applies a magnetic field to the media for recording.

One way to achieve a small confined hot spot is to use an optical near field transducer (NFT), such as a plasmonic optical antenna or an aperture, located near an air-bearing surface of a hard drive slider. Light may be launched from a light source (e.g., a laser diode) into optics such as a waveguide integrated into the slider. Light propagating in the waveguide may be directed to an optical focusing element, such as a planar solid immersion mirror (PSIM). The PSIM may concentrate the energy into a NFT. The NFT causes the energy to be delivered to the media in a very small spot.

FIG. 1 is a perspective view of a hard drive slider that includes a disclosed plasmonic NFT. HAMR slider 100 includes laser diode 102 located on top of HAMR slider 100 proximate to trailing edge surface 104 of HAMR slider 100. Laser diode 102 delivers light proximate to read/write head 106, which has one edge on air-bearing surface 108 (also referred to as "media-facing surface" or "media interfacing surface") of HAMR slider 100. Air-bearing surface (ABS) 108 is held proximate to a moving media surface (not shown) during device operation.

Laser diode 102 provides electromagnetic energy to heat the media at a point near to read/write head 106. Optical coupling components, such as a waveguide 110, are formed integrally within HAMR slider 100 to deliver light from laser diode 102 to the media. In particular, waveguide 110 and NFT 112 may be located proximate read/write head 106 to provide local heating of the media during write operations. Laser diode 102 in this example may be an integral, edge-emitting device, although it will be appreciated that waveguide 110 and NFT 112 may be used with any light source and light delivery mechanisms. For example, a surface emitting laser (SEL) may be used instead of the edge firing laser illustrated.

While the example in FIG. 1 shows laser diode 102 integrated with HAMR slider 100, the NFT 112 discussed herein may be useful in any type of light delivery configuration. For example, in a free-space light delivery configuration, a laser may be mounted externally to the slider, and coupled to the slider by way of optic fibers and/or waveguides. The slider in such an arrangement may include a grating coupler into which light is coupled and delivered to slider-integrated waveguide 110 which energizes the NFT 112.

The HAMR device utilizes the types of optical devices described above to heat the magnetic recording media (e.g., hard disc) in order to overcome the superparamagnetic effects that limit the areal data density of typical magnetic media. When writing to a HAMR medium, the light can be concentrated into a small hotspot over the track where writing takes place. The light propagates through waveguide 110 where it is coupled to the NFT 112 either directly from the waveguide or by way of a focusing element. Other optical elements, such as couplers, mirrors, prisms, etc., may also be formed integral to the slider. The optical elements used in HAMR recording heads are generally referred to as integrated optics devices.

As a result of what is known as the diffraction limit, optical components cannot be used to focus light to a dimension that is less than about half the wavelength of the light. The lasers used in some HAMR designs produce light with wavelengths on the order of 700-1550 nm, yet the desired hot spot is on the order of 50 nm or less. Thus the desired hot spot size is well below half the wavelength of the light. Optical focusers cannot be used to obtain the desired hot spot size, being diffraction limited at this scale. As a result, the NFT 112 is employed to create a hotspot on the media.

The NFT 112 is a near field optics device designed to reach local surface plasmon resonance at a designed wavelength. A waveguide and/or other optical element concentrates light on a transducer region (e.g., focal point) where the NFT 112 is located. The NFT 112 is designed to achieve surface plasmon resonance in response to this concentration of light. At resonance, a high electric field surrounds the NFT 112 due to the collective oscillations of electrons at the metal surface. Part of this field will tunnel into a storage medium and get absorbed, thereby raising the temperature of a spot on the media as it being recorded. NFTs generally have a surface that is made of a material that supports surface plasmons ("plasmonic metal") such as aluminum, gold, silver, copper, or alloys thereof. They may also have other materials but they must have a material that supports surface plasmons on their outer surface.

Figure 2:
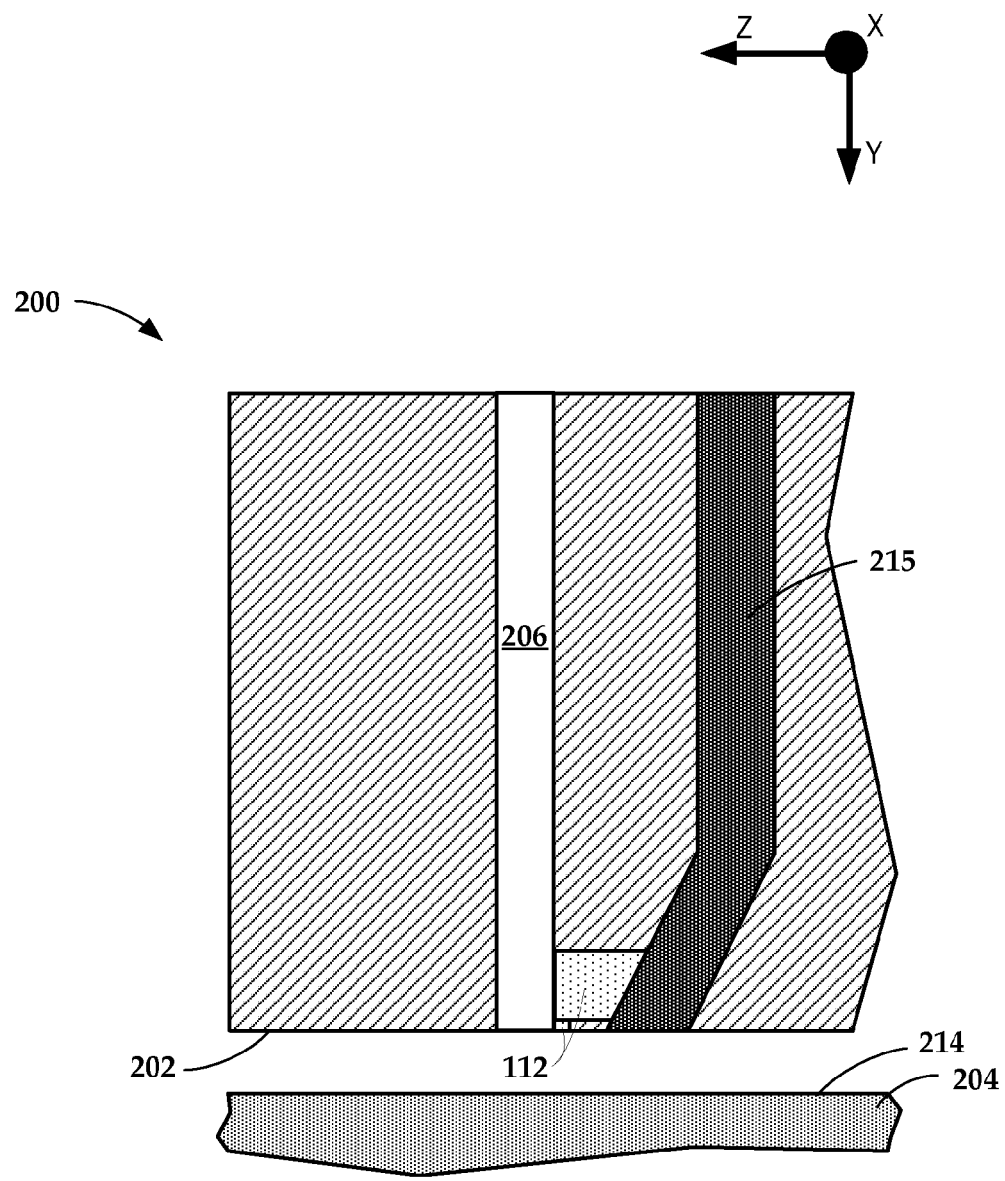
FIG. 2 is a side cross-sectional view of an apparatus that includes the near field transducer of FIG. 1, a write pole, a heat sink, and a waveguide according to an example embodiment.

FIG. 2 is a cross-sectional view that shows details of an apparatus 200 used for HAMR according to an example embodiment. The NFT 112 is located proximate a media interfacing surface 202 (e.g., ABS), which is held near a magnetic recording media 204 during device operation. In the orientation of FIG. 2, the media interfacing surface 202 is arranged parallel to the x-z plane. A waveguide core 206 may be disposed proximate the NFT 112, which is located at or near the media writing surface 214.

The NFT 112, waveguide core 206, and other components are built on a substrate plane, which is parallel to the x-y plane in this view. Waveguide core 206 is shown configured as a planar waveguide, and is surrounded by cladding layers (not shown) that have different indices of refraction than the core 206. Other waveguide configurations may be used instead of a planar waveguide, e.g., channel waveguide. Light propagates through the waveguide core 206. Electrical field lines emanate from the waveguide core 206 and excite the NFT 112. The NFT 112 delivers surface plasmon-enhanced, near field electromagnetic energy along the negative y-direction where it exits at the media interfacing surface 202. This may result in a highly localized hot spot (not shown) on the magnetic recording media 204. A magnetic recording pole 215 is located alongside NFT 112. The magnetic recording pole 215 generates a magnetic field (e.g., perpendicular field) used in changing the magnetic orientation of the hotspot during writing.

Many NFT designs include an enlarged region as well a peg region. The enlarged region will typically comprise substantially 90% or more of the volume of the NFT in some embodiments. Although discussed as a separate region or portion, typically the peg region is integrally fabricated of a same material as the enlarged region. The specific wavelength of light from the laser diode dictates the size of the enlarged region of the NFT and a length of the peg region in order to get optimal (maximum) coupling efficiency of the laser light to the NFT.

As discussed previously, the peg region acts as the writing tip of the NFT while the enlarged region is configured to receive concentrated electromagnetic energy from the laser diode/waveguide and is designed to help NFT achieve surface plasmon resonance in response to this concentration of electromagnetic energy. The peg region is in optical and/or electrical communication with the enlarged region and creates a focal point for the electromagnetic energy received by the enlarged region.

As is known, temperature increases in the peg region are a challenge for the durability of HAMR devices. A temperature mismatch between the relatively higher temperature peg region and relatively lower temperature enlarged region as well as mechanical stresses are thought to lead to an exchange of material (and vacancies) between the two regions. As used herein, the term "material" additionally includes any vacancies within the material. The temperature mismatch between the two regions as well as the mechanical stresses are thought to be phenomenon that drive peg deformation and peg recession, which can lead to failure of the HAMR device.

The present disclosure relates to apparatuses and methods related to a NFT for the HAMR device. In particular, embodiments of the NFT include a peg region that is separated from the remainder of the NFT by a barrier material. This isolation of the peg region from the remainder of the NFT reduces or eliminates interdiffusion of material between the peg region and the remainder of the NFT. The reduction or elimination of interdiffusion of material reduces the likelihood of peg recession and failure of the HAMR device.

Figure 3:
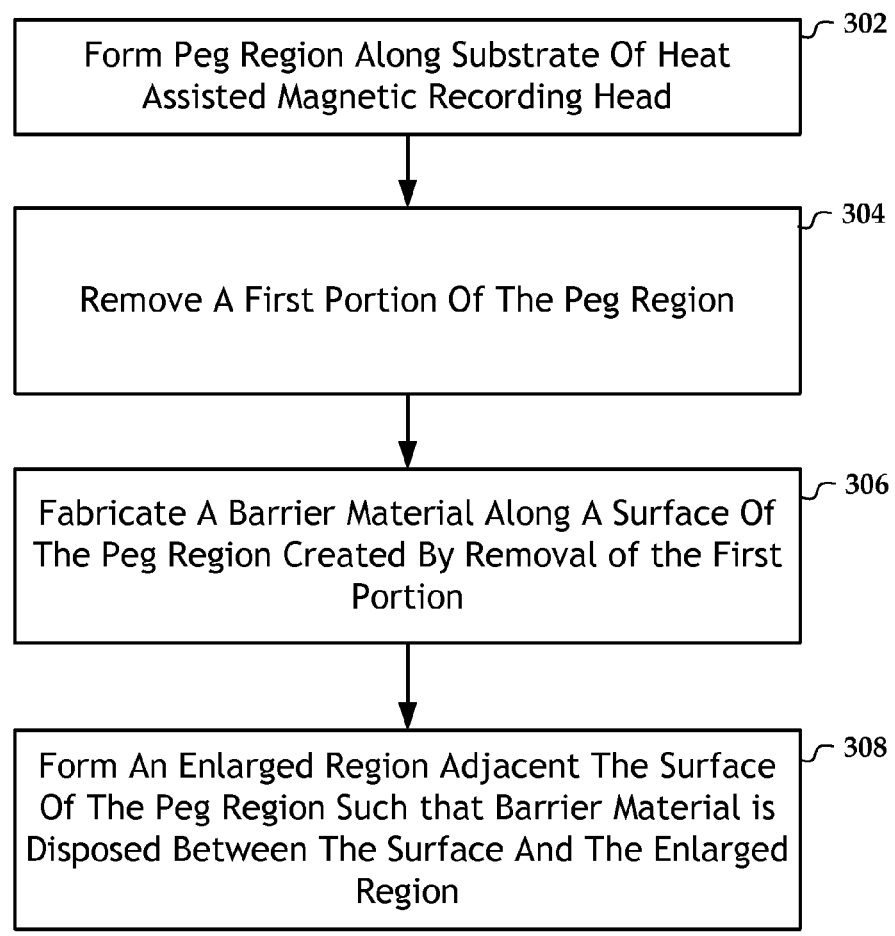
FIG. 3 is a flow diagram of a method of fabricating the near field transducer according to an example embodiment.

FIG. 3 illustrates a method of fabricating a NFT with a peg region separated from an enlarged region by a barrier material. The method forms 302 a peg region of the NFT along a first portion of a substrate of a heat assisted magnetic recording head. The first portion of substrate can comprise a core and/or cladding material (e.g. a dielectric material) such as $Al_2O_3$, SiOxNy, $SiO_2$, $Ta_2O_5$, $TiO_2$ or $Nb_2O_5$, etc. in some embodiments. The method removes 304 a first portion of the peg region and fabricates 306 a barrier material along a surface of the peg region created by the removal of the first portion. Additionally, the method forms 308 an enlarged region adjacent the surface of the peg region such that the barrier material is disposed at least between the surface of the peg region and the enlarged region.

Figure 4:
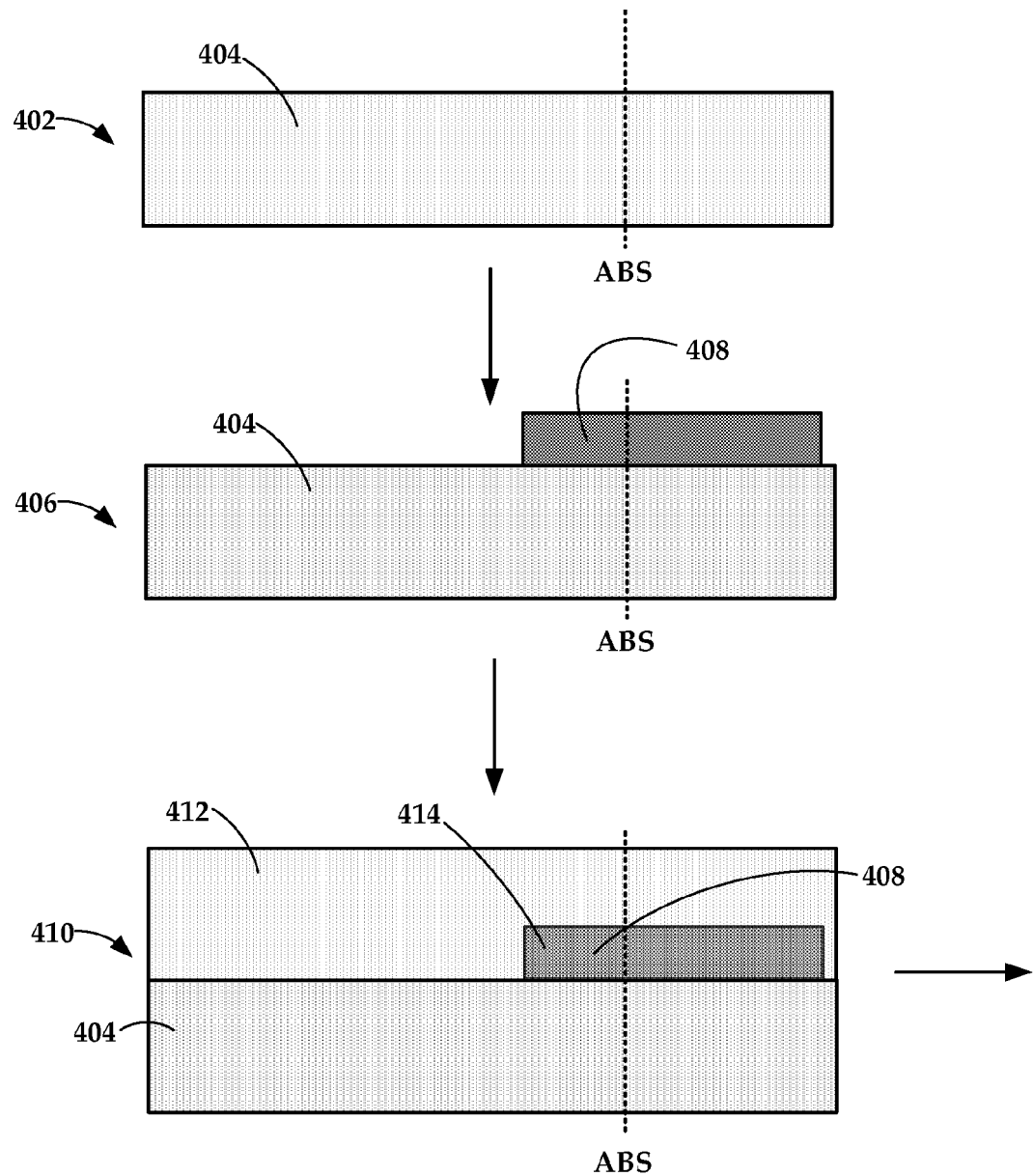
FIGS. 4 and 4A illustrate various fabrication techniques used to form the near field transducer according to an example embodiment.
Figure 4A:
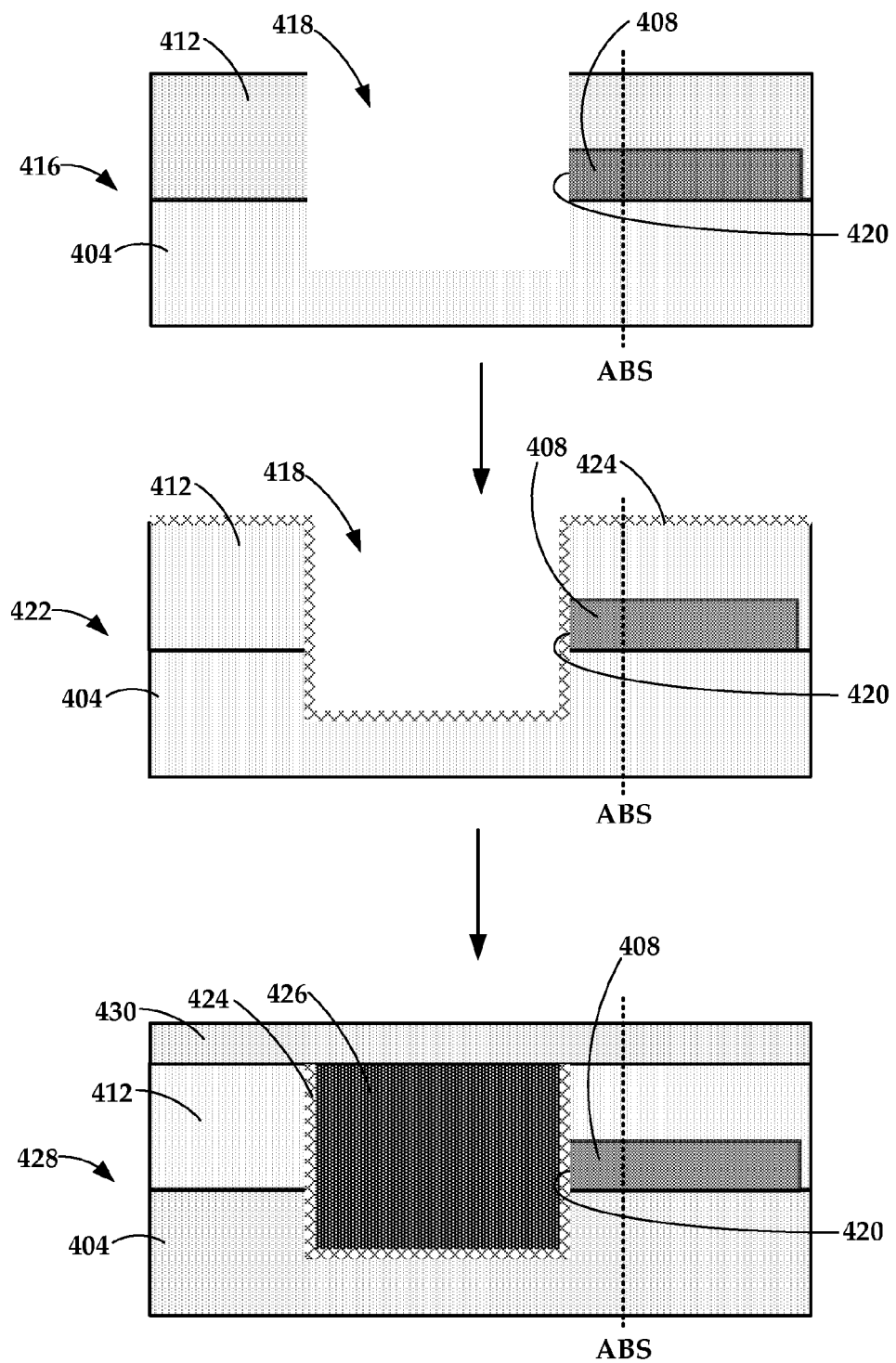

FIGS. 4 and 4A provide further illustration of a method of fabricating an NFT according to an exemplary embodiment. The method forms 402 a first portion 404 of a substrate of a heat assisted magnetic recording head. The first portion 404 of the substrate can comprise a dielectric material and can be part of the core and/or cladding of a waveguide, a spacer, etc. As illustrated in FIG. 4, the first portion 404 of the substrate may extend past an area that will subsequently be formed into the ABS during a subsequent dicing process at the wafer level. Thus, a part of the first portion 404 may be removed in subsequent steps when the ABS is formed.

The illustrated method forms 406 a peg region 408 along the first portion 404 of the substrate. According to one embodiment, the peg region 408 can be formed along the first portion 404 by deposition, patterning, and milling (e.g., by deposition of a sheet film of gold, pattern photolithography, and an Ar mill process). However, other fabrication techniques such a damascene process can be used to form the peg region 408 in other instances.

In step 410, a second portion 412 of the substrate is formed over the peg region 408. Similar to the first portion 404, the second portion 412 of the substrate can comprise a dielectric material and can be part of the core and/or cladding of a waveguide, a spacer, etc. Prior to and/or after deposition of the second portion 412 of the substrate, a process such as a chemical-mechanical polishing can be performed to planarize components such as the peg region 408, first portion 404, and/or second portion 412.

As illustrated in FIG. 4, the peg region 408 includes a first portion 414 spaced from the ABS. In the embodiment illustrated, the first portion 414 comprises an end part of the peg region 408. As illustrated in FIG. 4A, the first portion 414 can be removed at step 416. The removal of the first portion 414 of the peg region 408 can also involve removal of at least part of one or both of the first portion 404 and the second portion 412 of the substrate to create a volume 418 (e.g., a bounded void) that is subsequently filled with plasmonic metal to form the enlarged region. As illustrated in FIG. 4A, the removal creates a surface 420 of the peg region 408. This surface 420 is exposed to the volume 418.

Figure 5:
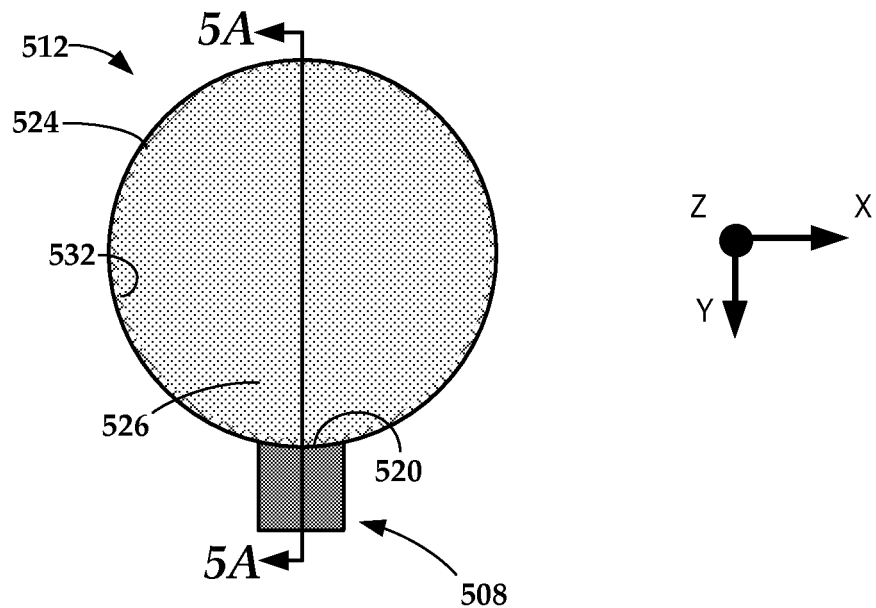
FIG. 5 is a first cross-sectional view of one embodiment of the near field transducer that includes a peg region separated from an enlarged region by a barrier material.
Figure 5A:
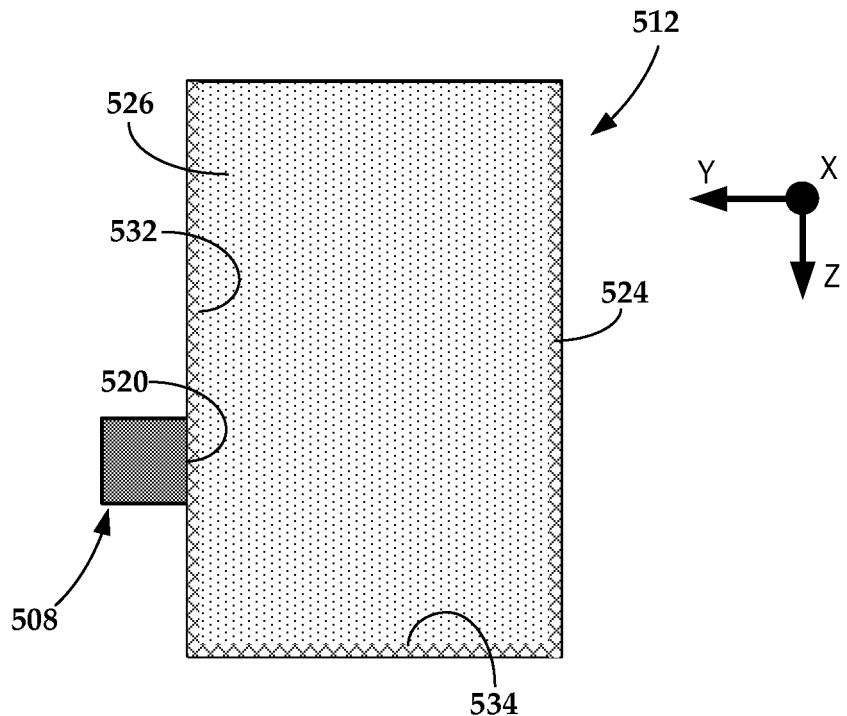
FIG. 5A is a second cross-sectional view of the near field transducer of FIG. 5.

As illustrated in step 416, removal of the first portion 414 of the peg region 408 can also involve removal of a part of the first portion 404 of the substrate to a greater depth than that of the peg region 408. When the fabrication of the NFT is completed, removal of the substrate to a greater depth than the peg region produces the NFT configuration as shown in FIGS. 5 and 5A with the peg region spaced from an end of the enlarged region.

In some instances, the step 416 of removing the first portion 414 of the peg region 408 involves removal of at least a part of the second portion 412 but does not substantially remove part of the first portion 404 such that a bottom surface of the volume 418 (and subsequently the enlarged region) is substantially flush with a bottom surface of the peg region 408. When the fabrication of the NFT is completed, removal of the second portion 412 (but substantially not the first portion 404) produces the NFT configuration illustrated in FIGS. 6 and 6A.

As shown in the embodiment of FIG. 4A, the method fabricates 422 a barrier material 424 at least along the surface 420 of the peg region 408 created by the removal of the first portion of the peg region 408. Fabrication of the barrier material can also involve disposing the barrier material 424 along a plurality of surfaces of the volume 418, and therefore, a plurality of surfaces of the enlarged region 426.

Suitable barrier materials 424 can include one or more of ZrN, TiN, Rh, Zr, Hf, Ru, AuN, AuO, TaN, Ir, W, Mo, Co, and alloys thereof. The barrier material 424 can have a thickness of between about 0.5 nm and about 10.0 nm according to some embodiments. Thus, the thickness of the barrier material 424 is not to scale and has been exaggerated in the FIGURES to aid in discussion and for visibility to the viewer. The barrier material 424 can comprise one or more layers that substantially separate the peg region 408 from the enlarged region 426. The barrier material 424 can be deposited using one or more techniques including sputtering, electro-deposition, ion beam deposition, chemical vapor deposition, physical vapor deposition, evaporation, plasma treatment/annealing, dopant/annealing, and/or plasma treatment/electrochemical processing, etc.

As shown in FIG. 4A, the volume 418 can be filled with plasmonic material at step 428 to form the enlarged region 426. The enlarged region 426 can be formed adjacent the surface 420 of the peg region such that the barrier material 424 is disposed at least between the surface 420 of the peg region 408 and the enlarged region 426. As illustrated in FIG. 4A, a third portion 430 of the substrate can be deposited over the second portion 412 and the enlarged region 426. Similar to the first and second portions 404 and 412, the third portion 430 can comprise a dielectric material and can be part of the core and/or cladding of a waveguide, a spacer, etc. Prior to and/or after deposition of the third portion 430, a process such as a chemical-mechanical polishing can be performed to planarize and/or remove components such as the enlarged region 426, barrier material 424, second portion 412, and/or third portion 430.

FIG. 5 shows a cross-sectional view of a sunken disk arrangement according to one embodiment of an NFT 512. FIG. 5A is a second cross-sectional view of the NFT 512. As illustrated in FIGS. 5 and 5B, the NFT 512 includes a peg region 508, an enlarged region 526, and a barrier material 524. Additionally, the peg region 508 includes a surface 520 and the enlarged region 526 includes an arcuate surface 532 and a bottom surface 534.

The embodiment of FIGS. 5 and 5A comprises a sunken disk arrangement that spaces the peg region 508 from the bottom surface 534 and the top surface of the enlarged region 526. The enlarged region 526 is disposed adjacent the peg region 508. The barrier material 524 is disposed between the peg region 508 and the enlarged region 526 to reduce or eliminate interdiffusion of materials between the peg region 508 and the enlarged region 526. However, the peg region 508 remains in optical and/or electrical communication with the enlarged region 526. The length, thickness, and other dimensional and physical properties of the barrier material 524 will depend upon the composition of the peg region and enlarged region and upon the specific wavelength of light from the laser diode. In one embodiment, the barrier material 524 has a thickness of between about 0.5 nm and about 10.0 nm. As previously discussed, the barrier material 524 can comprise one or more of ZrN, TiN, Rh, Zr, Hf, Ru, AuN, AuO, TaN, Ir, W, Mo, Co, and alloys thereof. In some cases, the barrier material 524 can create a diffusion barrier for Au and other plasmonic metals and have a thermal conductivity greater than about 10 W/m-K in some embodiments. Additionally, the barrier material 524 can have an appreciable optical figure of merit. Although best described as a layer in some embodiments, the barrier material 524 can include one or more layers or can be a component that is not layered in nature.

The peg region 508 can extend from the surface 520 toward a media-facing surface (e.g., media interfacing surface 202 in FIG. 2). In the illustrated embodiment, the enlarged region 526 has a circular disk shape. In the context of describing the shape of the enlarged region 526, the term "disk" refers to three-dimensional shapes that include a cylindrical or tapered cylindrical portion, a bottom surface 534, and a top surface. Thus, the disk shape can include a truncated conical shape in some instances. The bottom surface 534 may or may not be arranged in a plane parallel with the top surface and may or may not be isolated from substrate (not shown) by the barrier material 524.

The peg region 508 and the enlarged region 526 can be formed from a thin film of plasmonic metal (e.g., aluminum, gold, silver, copper, and combinations or alloys thereof) on a substrate plane of the slider proximate the write pole (e.g., magnetic recording pole 215 in FIG. 2). In some embodiments, the peg region 508 and the enlarged region 526 can be formed from the same material.

Figure 6:
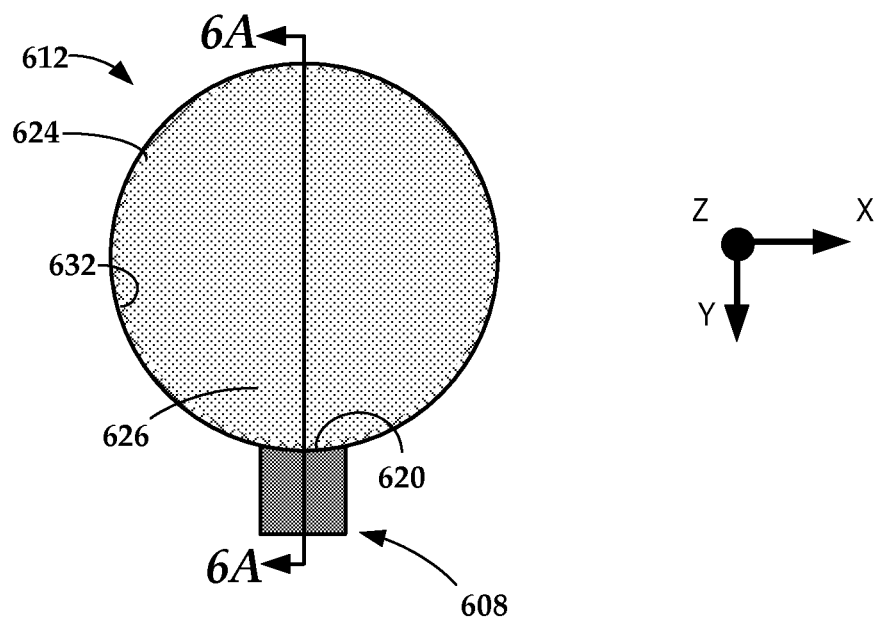
FIG. 6 is side cross-sectional view of another embodiment of the near field transducer that includes a peg region separated from an enlarged region by a barrier material.
Figure 6A:
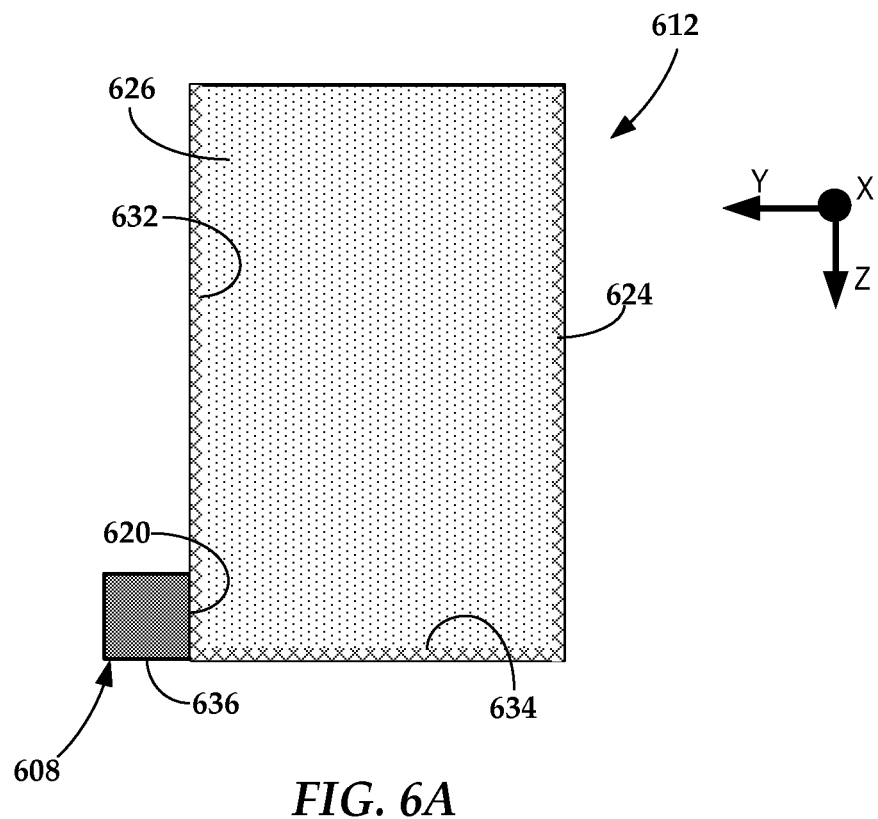
FIG. 6A is a second cross-sectional view of the near field transducer of FIG. 6.

FIGS. 6 and 6A show another embodiment of an NFT 612 with a peg region 608 disposed adjacent an end portion of an enlarged region 626. The general characteristics and construction of the NFT 612 is similar to that of the embodiments of FIGS. 4, 4A, 5, and 5A, and therefore, will not be described in great detail. FIG. 6 shows a first cross-sectional view of the NFT 612. FIG. 6A is a second cross-sectional view of the NFT 612. As illustrated in FIGS. 6 and 6A, the NFT 612 includes the peg region 608, the enlarged region 626, and a barrier material 624. Additionally, the peg region 608 includes a surface 620 and the enlarged region 626 includes an arcuate surface 632 and a bottom surface 634. The embodiment of FIGS. 6 and 6A has a bottom peg surface 636 that generally aligns with the barrier material 624 disposed along the bottom surface 634 of the enlarged region 626.

Similar to the previously discussed embodiments, the peg region 608 is spaced from and interfaces with the enlarged region 626 along a single surface (surface 620). The surface 620 (and peg region 608) is spaced from the enlarged region 626 by the barrier material 624, which isolates the peg region 608 from the enlarged region 626 to reduce interdiffusion between the components.

Figure 7:
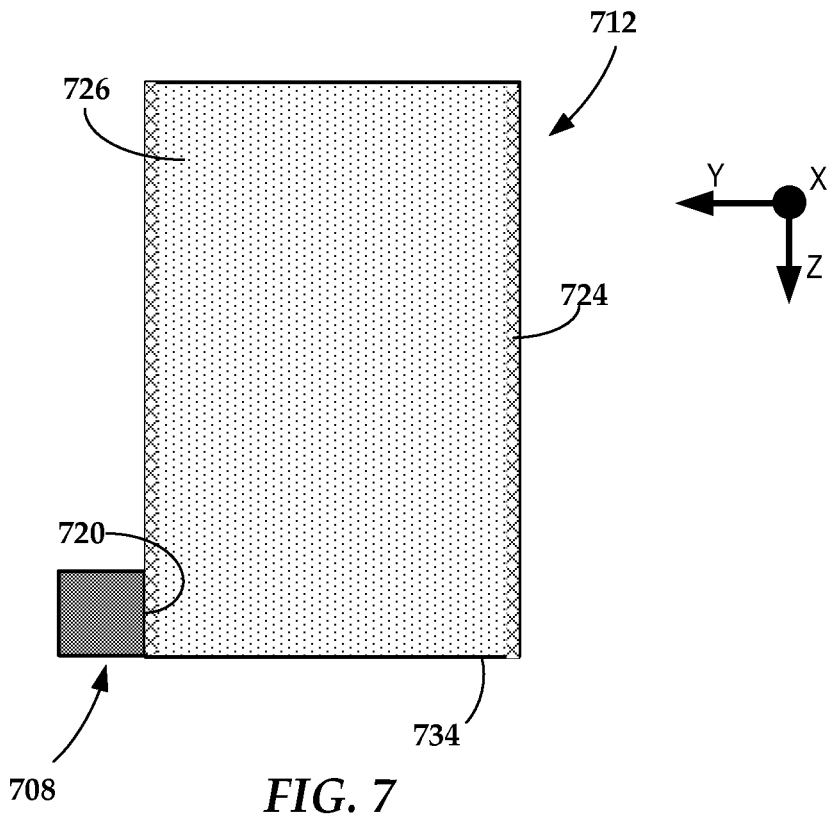
FIGS. 7 and 8 are cross-sectional views of additional embodiments of the near field transducer.
Figure 8:
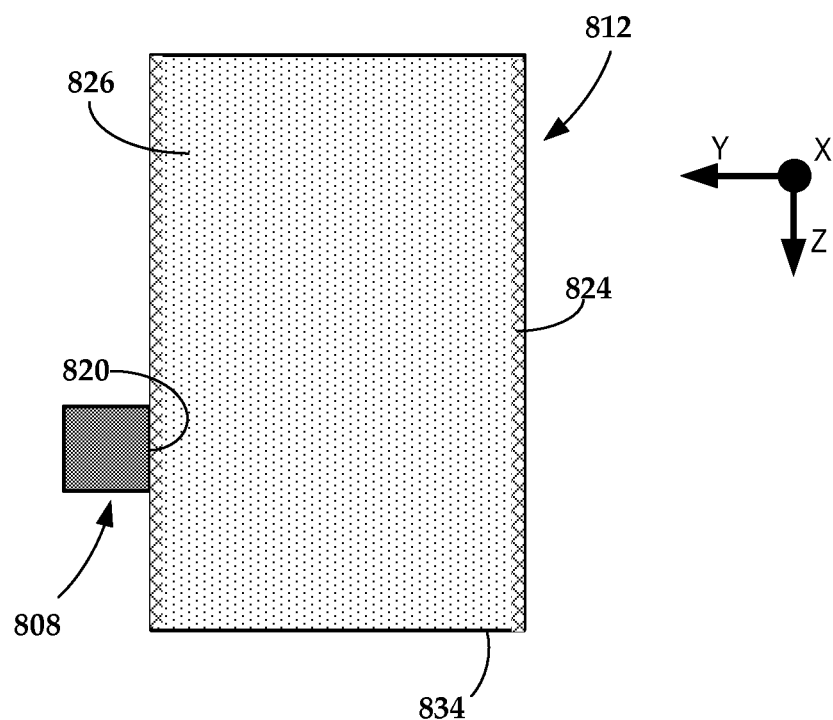

FIGS. 7 and 8 illustrate further NFT 712 and 812 embodiments where the barrier material 724 and 824 has either been removed or was not deposited along a bottom surface 734 and 834 of the enlarged region 726 and 826. Thus, in some embodiments the barrier material 724 and 824 can be removed from one or more non-peg interfacing surfaces (e.g., the bottom surface) of the enlarged region 726 and 826. As with previously discussed embodiments, the peg region 706 and 806 of each embodiment is spaced from (by the barrier material 724 and 824) and interfaces with the enlarged region 726 and 826 along a single surface (surface 720 and 820).

Figure 9:
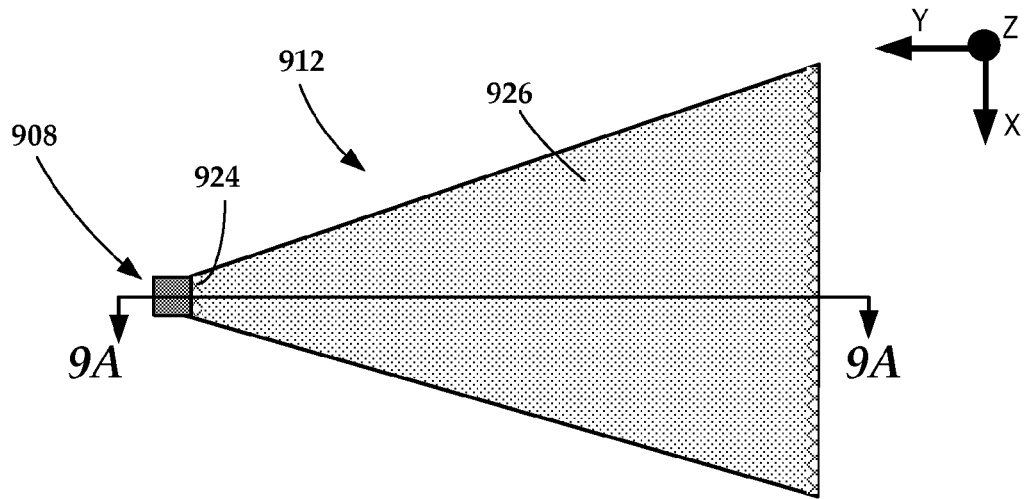
FIG. 9 is a cross-sectional view of the near field transducer according to another embodiment.
Figure 9A:
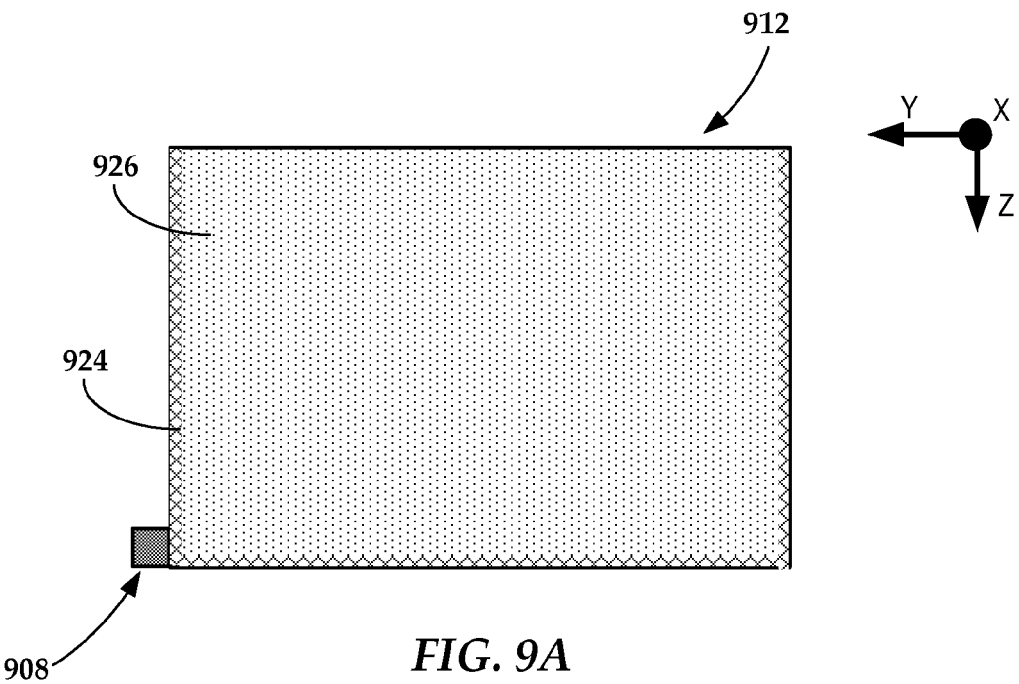
FIG. 9A is a second cross-sectional view of the near field transducer of FIG. 9.

FIGS. 9 and 9A illustrate that the methods of FIGS. 3, 4, and 4A and the concept of isolating the peg region 908 from the enlarged region 926 are applicable to all manner of NFT including an NFT 912 embodiment with an enlarged region 926 having a non-disk shape that utilizes propagating surface plasmons that travel along a plane of the NFT to the peg region. FIG. 9 shows a first cross-sectional view of the NFT 912. FIG. 9A is a second cross-sectional view of the NFT 912.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof. All references cited within are herein incorporated by reference in their entirety.

What is claimed is:

1. A method, comprising:
   forming a peg region of a near field transducer along a first portion of a substrate of a heat assisted magnetic recording head;
   removing a first portion of the peg region to expose a surface of the peg region opposing a media-facing surface of the peg region;
   fabricating a barrier material along the surface of the peg region created by the removal of the first portion of the peg region; and
   forming an enlarged region adjacent the surface such that the barrier material is disposed at least between the surface of the peg region and the enlarged region, the barrier material separating the peg region from the enlarged region.

2. The method of claim 1, further comprising forming at least a second portion of the substrate over the peg region.

3. The method of claim 2, wherein at least one of the first portion and the second portion of the substrate comprises a dielectric material of a waveguide.

4. The method of claim 2, wherein removing the first portion of the peg region removes at least a part of one or both of the first portion and the second portion of the substrate to create a volume that is filled during forming of the enlarged region.

5. The method of claim 4, wherein removing the first portion of the peg region removes at least a part of the second portion but does not substantially remove part of the first portion such that a bottom surface of the volume is substantially flush with a bottom surface of the peg region.

6. The method of claim 1, wherein removing the first portion of the peg region removes a part of the first portion of the substrate to a depth greater than that of the peg region.

7. The method of claim 1, wherein fabricating the barrier material disposes the barrier material along a plurality of surfaces of the enlarged region.

8. The method of claim 1, further comprising removing the barrier material from one or more non-peg interfacing surfaces of the enlarged region.

9. The method of claim 8, wherein removing the barrier material removes the barrier material to allow a bottom surface of the enlarged region to be exposed to the first portion of the substrate.

10. The method of claim 1, further comprising:
forming at least a second portion of the substrate over the peg region; and
removing at least a part of the second portion of the substrate.

11. An apparatus, comprising:
an enlarged region comprising a first plasmonic metal;
a peg region comprising a second plasmonic metal, a media-facing surface, and a single surface opposing the media-facing surface, wherein the single surface interfaces with the enlarged region; and
a barrier material disposed between the enlarged region and the single surface of the peg region such that the barrier material separates the enlarged region from the peg region.

12. The apparatus of claim 11, wherein the second plasmonic metal has a same composition as the first plasmonic metal of the peg region.

13. The apparatus of claim 11, wherein the barrier material comprises one or more of ZrN, TiN, Rh, Zr, Hf, Ru, AuN, AuO, TaN, Ir, W, Mo, Co, and alloys thereof.

14. The apparatus claim 11, wherein the barrier material is disposed along only the single surface at a non-media interfacing end of the peg region.

15. The apparatus of claim 11, wherein the barrier material has a thickness of between about 0.5 nm and about 10.0 nm and is configured to reduce interdiffusion between the peg region and the enlarged region.

16. The apparatus of claim 11, wherein the enlarged region is a disk shaped object.

17. An apparatus, comprising:
a system configured to facilitate heat assisted magnetic recording; and
a near field transducer disposed in the system, the near field transducer comprising:
an enlarged region comprising a first plasmonic metal;
a peg region comprising a second plasmonic metal, a media-facing surface, and a single surface opposing the media-facing surface, wherein the single surface interfaces with the enlarged region; and
a barrier material disposed between the enlarged region and the single surface of the peg region such that the barrier material separates the enlarged region from the peg region.

18. The apparatus of claim 17, wherein the second plasmonic metal has a same composition as the first plasmonic metal of the peg region.

19. The apparatus of claim 17, wherein the barrier material comprises one or more of ZrN, TiN, Rh, Zr, Hf, Ru, AuN, AuO, TaN, Ir, W, Mo, Co, and alloys thereof.

20. The apparatus claim 17, wherein the barrier material is disposed along only the single surface at a non-media interfacing end of the peg region.

* * * * *